No. 628,018. Patented July 4, 1899.
J. MUSKETT.
SAFETY DEVICE FOR HYDRAULIC HOSE.
(Application filed Feb. 28, 1899.)
(No Model.)
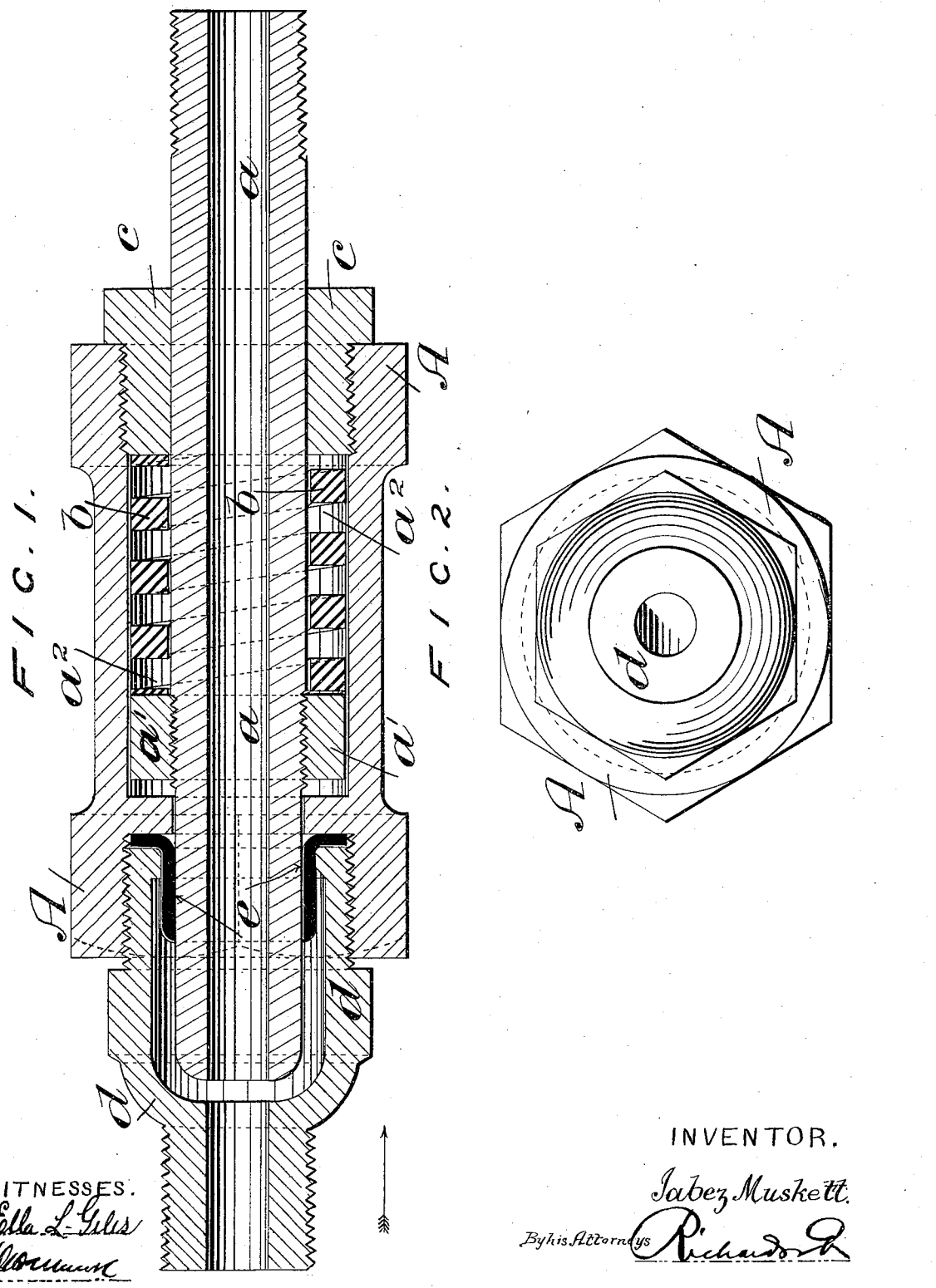
WITNESSES.
Ella L. Giles
INVENTOR.
Jabez Muskett.
By his Attorneys Richardson

UNITED STATES PATENT OFFICE.

JABEZ MUSKETT, OF MANCHESTER, ENGLAND, ASSIGNOR TO THE F. REDDAWAY & COMPANY, LIMITED, OF SAME PLACE.

SAFETY DEVICE FOR HYDRAULIC HOSE.

SPECIFICATION forming part of Letters Patent No. 628,018, dated July 4, 1899.

Application filed February 28, 1899. Serial No. 707,211. (No model.)

*To all whom it may concern:*

Be it known that I, JABEZ MUSKETT, foreman fitter, a subject of the Queen of Great Britain and Ireland, residing at 15 Hersal View, Bolton road, Pendleton, Manchester, in the county of Lancaster, England, have invented a certain new and useful improved appliance or safety device for use in connection with hose employed to convey pressure to hydraulic riveters, percussive tools, and the like, (for which I have made application for a patent in Great Britain, No. 18,388, dated August 27, 1898,) of which the following is a specification.

My said invention relates to a safety device or appliance for use with hydraulic hose and particularly for the hose employed to convey pressure to hydraulic riveters and similar percussive tools. As is well known, such hose is subjected when in use to heavy intermittent strains as the fluid-pressure is turned on and cut off to operate the piston of the tool. These strong pulsations of the water-pressure exert a powerful longitudinal strain on the hose, tending to damage the same and causing leakage at the couplings.

The object of my invention is to introduce at a convenient point or points in the length of the hose one or more safety device or devices to take up the longitudinal strain, and thus relieve to a great extent the hose and couplings.

My invention will be clearly understood from a perusal of the following description, in which reference is made to the accompanying sheet of drawings.

In the said drawings, Figure 1 is a longitudinal section of my improved safety device or appliance. Fig. 2 is an end view of the same, looking in the direction of the arrow.

In constructing a safety device in accordance with my invention I provide a sliding tubular part $a$, which is arranged to work within a suitable casing A. This tubular part is formed with or has secured thereto a suitable collar or ruff $a'$, designed to act as a piston and to work within a cylindrical chamber $a^2$, formed in the casing A, against the action of a powerful spring $b$. This spring $b$ is held up to its work by means of a gland $c$, through which passes one end of the sliding tubular part $a$. The other end of the sliding tubular part $a$ projects slightly beyond the end of the casing A, as shown in the drawings, the casing being screwed or attached to a union or gland $d$. To insure the fluid-tight working of the sliding tubular part $a$, I introduce between the cupped end of the casing A and the screwed gland or union $d$ a cup leather or packing $e$.

The hose is secured to the end of the device in the ordinary or any convenient manner.

The intermittent longitudinal pressure exerted by the pulsations of the fluid causes the piston $a'$ to slide within the casing A against the action of the spring $b$, thus relieving the hose and couplings from the strain. On the pressure ceasing the spring returns the sliding piston to its normal position within the casing. By these means the longitudinal strain is taken up by the sliding piston or gradually communicated thereby to the hose, thus obviating leakage of the couplings or damage to the hose.

I may use one or more of my improved safety devices in a length of hose, as will be well understood, the same being introduced at intervals as required.

I declare that what I claim is—

In combination, the casing A, having a cupped end a tubular part $a$ sliding therein, a collar $a'$ secured to the tubular part and adapted to act as a piston, a spring in the casing A bearing on the collar, the gland $c$ against which the spring bears, the union-gland $d$ attached to the cupped end of the casing A and receiving a portion of the tubular part which projects from the casing A and the packing $e$ between the gland $d$, the cupped end of the casing and the tubular part $a$, substantially as described.

In witness whereof I have hereunto set my hand in presence of two witnesses.

JABEZ MUSKETT.

Witnesses:
JOSHUA ENTWISLE,
ALFRED YATES.